S. C. Ketchum,
Pipe Coupling.
N° 43,998.  Patented Aug. 30, 1864.
Fig: 1
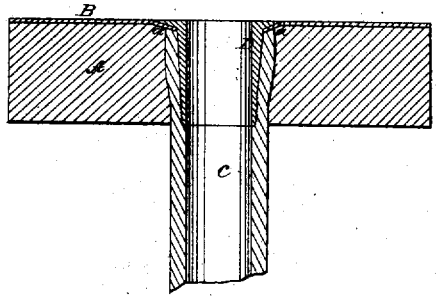
Fig: 2
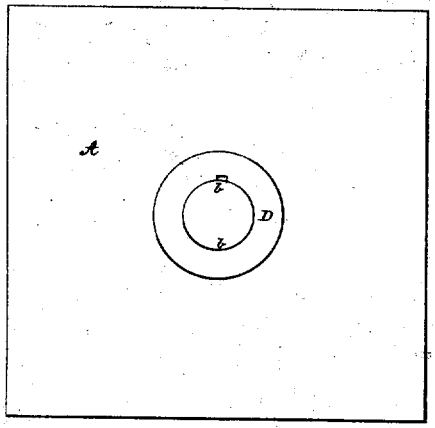
Witnesses:  Inventor:

UNITED STATES PATENT OFFICE.

S. C. KETCHUM, OF WINCHENDON, MASSACHUSETTS.

IMPROVEMENT IN THE MODE OF ATTACHING PIPES TO SINKS.

Specification forming part of Letters Patent No. 43,998, dated August 30, 1864.

*To all whom it may concern:*

Be it known that I, S. C. KETCHUM, of Winchendon, in the county of Worcester and State of Massachusetts, have invented a new and useful Improvement in Connecting Lead and other Pipes; and I do hereby declare that the following is a full, clear, and exact description thereof, which will enable any person skilled in the art to fully understand the same, reference being had to the accompanying drawings, forming a part of this specification, in which—

Figure 1 is a side sectional elevation of pipe and sink-bottom. Fig. 2 is a plan view of the same.

Similar letters of reference indicate the same parts.

My invention is applicable to the connection of lead and other pipes with the bottoms of sinks and all kinds of vessels, and also to the connection of tin and other compressible pipes.

A is the bottom of a sink or vessel of any kind; B, a zinc lining applied in the usual manner; C, the pipe for conducting off the fluid from the sink or other vessel.

A common method for connecting the pipe C with the lining is to have the end of the pipe project up above the bottom of the sink A and then press out the edges of the pipe C and hammer or head the said edges down upon the bottom of the sink. Another method is to solder the edges of the pipe to the zinc lining; but both of these methods are troublesome in their application, and after use for a short time the joint between the edges of the pipe and the sink or lining is apt to become leaky. When the pipe becomes frozen up and it becomes necessary to separa e the pipe from the sink, these methods are also disadvantageous, because they do not a low of the convenient removal or disconnection and replacement of the pipe. The use of my improvement overcomes these difficulties. The orifice in the sink, into which the pipe C passes, is made somewhat conical in form and countersunk at *a* in the usual manner, as shown in Fig. 1. The lining B is bent down into the countersunk portion at the mouth of the pipe-orifice, and the end of the pipe C is brought up against the under side of the lining B, as shown. I now connect the lining, sink, and pipe by introducing into the mouth of the pipe a hollow conical pressing-nut, D, in the manner shown in Fig. 1. The orifice through the nut D is of the same diameter as that of the pipe C. The exterior of the nut D is, however, of conical form, and its lower extremity has a screw-thread cut upon its outer surface. When the nut D is forced into the mouth of the pipe C and turned, the nut will descend and its conical exterior will gradually expand the upper end of the pipe, and the latter will be pressed outward against the sides of the orifice in the sink A, and thus the pipe will be very firmly connected with the sink.

In order to disconnect the pipe from the sink it is only necessary to unscrew the nut D and remove it from the orifice of the pipe. There are two recesses, *b b*, in the mouth of the nut D to receive a screw-driver, by which the nut is turned when desired.

I have herein described my invention in its application to lead pipes chiefly; but I wish it to be distinctly understood that it is applicable in substantially the same manner to tin pipes and to pipes made of any other yielding or compressible material.

Having thus described my invention, the following is what I claim as new and desire to secure by Letters Patent:

In combination with the sink-bottom A B and the pipe C, of ductile material, the hollow tapering utn D, threaded on its external surface and fitted and screwed into the pipe C in the manner and for the purposes shown and described.

S. C. KETCHUM.

Witnesses:
E. S. MERRITT,
WM. L. WOODCOCK.